US012678803B2

(12) United States Patent
Kim et al.

(10) Patent No.: US 12,678,803 B2
(45) Date of Patent: Jul. 14, 2026

(54) ELECTROSTATIC PURIFICATION DEVICE OF FLUID, FLUID PURIFICATION FACILITY, AND METHOD OF PURIFYING FLUID

(71) Applicant: SAMSUNG ELECTRONICS CO., LTD., Suwon-si (KR)

(72) Inventors: Yunho Kim, Yongin-si (KR); Jaeeun Song, Hwaseong-si (KR); Hyunwoo Kim, Yongin-si (KR); Seokjun Won, Seoul (KR); Taewan Kim, Suwon-si (KR); Jinhyeok Jang, Suwon-si (KR); Chungkyung Jung, Anyang-si (KR); Yigil Cho, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 819 days.

(21) Appl. No.: 17/987,179

(22) Filed: Nov. 15, 2022

(65) Prior Publication Data

US 2023/0226560 A1 Jul. 20, 2023

(30) Foreign Application Priority Data

Jan. 14, 2022 (KR) ........................ 10-2022-0006176

(51) Int. Cl.
| | |
|---|---|
| *B03C 5/02* | (2006.01) |
| *C02F 1/00* | (2023.01) |
| C02F 1/469 | (2023.01) |
| *C02F 1/48* | (2023.01) |
| C02F 103/04 | (2006.01) |
| C02F 103/34 | (2006.01) |

(52) U.S. Cl.
CPC ................ *B03C 5/02* (2013.01); *C02F 1/001* (2013.01); *C02F 1/469* (2013.01); *C02F 1/48* (2013.01);

(Continued)

(58) Field of Classification Search
None
See application file for complete search history.

(56) References Cited

U.S. PATENT DOCUMENTS

| | | | |
|---|---|---|---|
| 7,150,816 B2 | 12/2006 | Klocke et al. | |
| 9,751,091 B2 | 9/2017 | Chi et al. | |

(Continued)

FOREIGN PATENT DOCUMENTS

| | | | | |
|---|---|---|---|---|
| CN | 104556516 A | * | 4/2015 | .............. C02F 1/048 |
| CN | 113003801 A | * | 6/2021 | .......... C02F 1/46109 |

(Continued)

OTHER PUBLICATIONS

Giang T.H. Tran et al., "Fabrication of polystyrene colloidal crystal film by electrophoretic deposition", Advanced Powder Technology, vol. 31, Issue 8, Elsevier, Aug. 1, 2020, 9 pages total.

(Continued)

*Primary Examiner* — Richard C Gurtowski
(74) *Attorney, Agent, or Firm* — Sughrue Mion, PLLC

(57) ABSTRACT

An electrostatic purification device includes a purification tank housing configured to accommodate a fluid, a first electrode and a second electrode provided in the purification tank housing, a direct current (DC) power supply configured to apply a DC to the first electrode and the second electrode, a controller configured to monitor a current density between the first electrode and the second electrode, and determine whether purification is completed based on the current density, a first valve configured to control an introduction flow of the fluid into the purification tank housing, a second valve configured to control a discharge flow of the fluid from the purification tank housing, and a heat exchanger configured to cool the fluid accommodated in the purification tank housing.

13 Claims, 8 Drawing Sheets

1

(52) U.S. Cl.
CPC ...... *B03C 2201/24* (2013.01); *C02F 2103/04* (2013.01); *C02F 2103/346* (2013.01); *C02F 2209/40* (2013.01); *C02F 2209/44* (2013.01)

(56) References Cited

U.S. PATENT DOCUMENTS

| | | | |
|---|---|---|---|
| 10,688,437 | B2 | 6/2020 | Koh et al. |
| 11,139,159 | B2 | 10/2021 | Greeley et al. |
| 2007/0108056 | A1* | 5/2007 | Nyberg ................. B01D 61/54 |
| | | | 204/554 |
| 2021/0130951 | A1 | 5/2021 | Hong et al. |

FOREIGN PATENT DOCUMENTS

| | | |
|---|---|---|
| JP | 2009-269008 A | 11/2009 |
| KR | 10-1404158 B1 | 6/2014 |
| KR | 10-2267914 B1 | 6/2021 |
| WO | WO-2012048425 A1 * | 4/2012 ........... C02F 1/4672 |
| WO | 2020/185244 A1 | 9/2020 |

OTHER PUBLICATIONS

Hosub Lim et al., "Continuous Purification of Colloidal Quantum Dots in Large-Scale Using Porous Electrodes in Flow Channel", Scientific Reports, 7, Article No. 43581, DOI: 10.1038/srep43581, Feb. 27, 2017, 9 pages total.

John D. Bass et al., "An Efficient and Low-Cost Method for the Purification of Colloidal Nanoparticles", Angewandte Chemie International Edition, vol. 50, Issue 29, DOI: 10.1002/anie.201100112, May 27, 2011, 6 pages total.

Yao-Tung Lin et al., "Separation of nano-sized colloidal particles using cross-flow electro-filtration", Separation and Purification Technology, vol. 58, Issue 1, Elsevier, doi: 10.1016/j.seppur.2007.07.035, Dec. 1, 2007, 11 pages total.

* cited by examiner

ELECTROSTATIC PURIFICATION DEVICE OF FLUID, FLUID PURIFICATION FACILITY, AND METHOD OF PURIFYING FLUID

CROSS-REFERENCE TO RELATED APPLICATION

This application is based on and claims priority under 35 U.S.C. § 119 to Korean Patent Application No. 10-2022-0006176, filed on Jan. 14, 2022, in the Korean Intellectual Property Office, the disclosure of which is incorporated by reference herein in its entirety.

BACKGROUND

1. Field

Example embodiments of the disclosure relate to an electrostatic purification device, a fluid purification facility, a fluid purification system, and a method of purifying fluid, and more particularly, an electrostatic purification device capable of mass-purifying fluid used in a semiconductor process at a high purity in a short time, a fluid purification facility, and a method of purifying fluid.

2. Description of Related Art

As a semiconductor process is miniaturized, impurities, such as extremely small particles or metal ions, are the cause of defects. Filters have been widely used to remove these impurities from various fluids used in the semiconductor process. However, because the improvement of filtration performance has not kept pace with the miniaturization rate of the semiconductor process, the development of new technology capable of removing impurities of an extremely fine size from fluid is required.

SUMMARY

Provided is an electrostatic purification device capable of mass-purifying fluid used in a semiconductor process at a high purity in a short time.

Provided is a fluid purification system or system capable of mass-purifying fluid used in a semiconductor process at a high purity in a short time.

Provided is a purification method capable of mass-purifying fluid used in a semiconductor process at a high purity in a short time.

Additional aspects will be set forth in part in the description which follows and, in part, will be apparent from the description, or may be learned by practice of the presented embodiments.

According to an aspect of the disclosure, an electrostatic purification device may include a purification tank housing configured to accommodate a fluid, a first electrode and a second electrode provided in the purification tank housing, a direct current (DC) power supply configured to apply a DC to the first electrode and the second electrode, a controller configured to monitor a current density between the first electrode and the second electrode, and determine whether purification is completed based on the current density, a first valve configured to control an introduction flow of the fluid into the purification tank housing, a second valve configured to control a discharge flow of the fluid from the purification tank housing, and a heat exchanger configured to cool the fluid accommodated in the purification tank housing.

According to an aspect of the disclosure, a fluid purification system may include a supply tank of a fluid, an electrostatic purification device configured to receive the fluid from the supply tank and purify the fluid, a filter configured to filter the fluid, and a storage tank configured to store the fluid that is filtered. The electrostatic purification device may include a purification tank housing configured to accommodate the fluid, a first electrode and a second electrode provided in the purification tank housing, a DC power supply configured to apply a DC to the first electrode and the second electrode, a controller configured to monitor a current density between the first electrode and the second electrode and determine whether purification is completed based on the current density, a first valve configured to control an introduction flow of the fluid into the purification tank housing, a second valve configured to control a discharge flow of the fluid from the purification tank housing, and a heat exchanger configured to cool the fluid accommodated in the purification tank housing.

According to an aspect of the disclosure, a method of purifying a fluid may include pre-cleaning a first electrode and a second electrode in a purification tank housing, filling the purification tank housing with the fluid after the pre-cleaning, in a state in which a first valve configured to control an introduction flow of the fluid into the purification tank housing and a second valve configured to control a discharge flow of the fluid from the purification tank housing are closed, applying DC to the first electrode and the second electrode and purifying the fluid, determining an end time of purification of the fluid based on a decrease in a current density between the first electrode and the second electrode, and discharging the fluid from the purification tank housing through the second valve.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
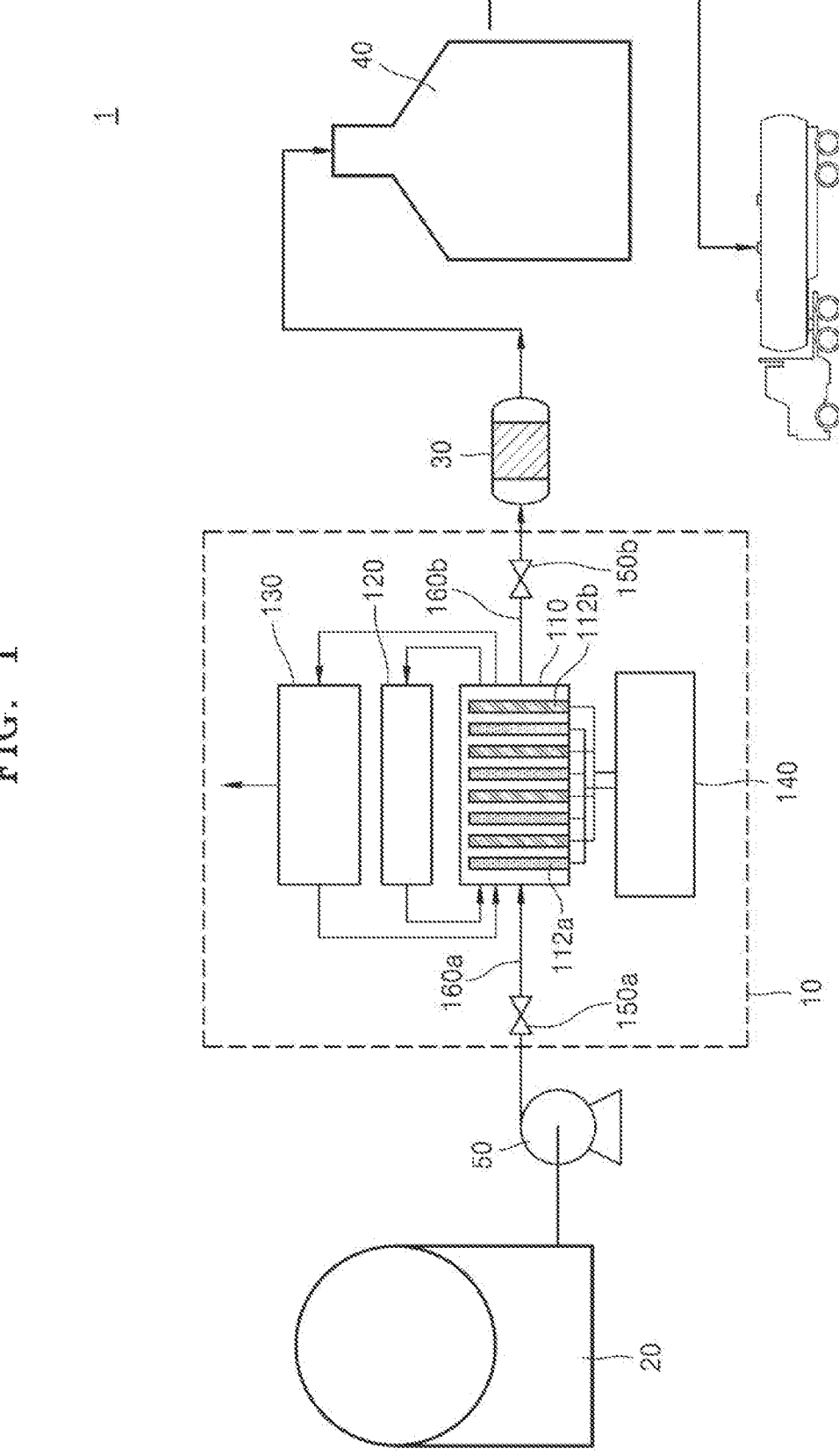
FIG. 1 is a diagram of a fluid purification system according to an embodiment of the disclosure.

Hereinafter, embodiments of the disclosure will be described in detail with reference to the accompanying drawings. The same reference numerals are used for the same components in the drawings, and redundant descriptions thereof are omitted.

FIG. 1 is a diagram of a fluid purification system according to an embodiment of the disclosure.

Referring to FIG. 1, the fluid purification system 1 may include a supply tank 20 of a fluid to be purified, an electrostatic purification device 10 configured to receive the fluid from the supply tank 20 and purify the fluid, a filter 30 filtering the fluid discharged from the electrostatic purification device 10, and a storage tank 40 storing the filtered fluid.

The fluid to be purified may be any fluid used in a semiconductor process. For example, the fluid may be ultra-pure water (UPW), an organic compound in liquid phase or in gas phase, a non-ionic liquid, etc., but is not limited thereto.

The supply tank 20 is a tank storing the fluid to be purified, and may be configured to store a fluid, which is a liquid or gas. For example, when storing high-pressure gas, the supply tank 20 may be a ball tank. For example, the supply tank 20 may be a tank with a floating roof when storing a volatile liquid.

The fluid may be supplied to the electrostatic purification device 10 by a fluid feed pump 50. The fluid feed pump 50 may be appropriately designed or selected considering the properties of a fluid to be supplied, for example, phase, boiling point, viscosity, specific gravity, etc.

The fluid is electrostatically purified in the electrostatic purification device 10. Therefore, charged particles or ions may be removed from the fluid at a high removal rate. The electrostatic purification device 10 may include a purification tank housing 110, a first electrode 112a, a second electrode 112b, a first valve 150a, a second valve 150b, a controller 140, a heat exchanger 120, a gas removal tank 130, etc., as described in more detail below.

The purified fluid is stored in the storage tank 40 after passing through the filter 30. Thereafter, the fluid may be loaded from the storage tank 40 to a transportation means and used in a process requiring the fluid, but the disclosure is not limited thereto. In some embodiments, the storage tank 40 may be directly connected to the process requiring the fluid and configured to supply the fluid.

The filter 30 is a non-electrostatic filtering device, and may be any filtering device capable of at least partially removing impurities. For example, the filter 30 may be a sieving filter and/or a non-sieving filter.

Figure 2:
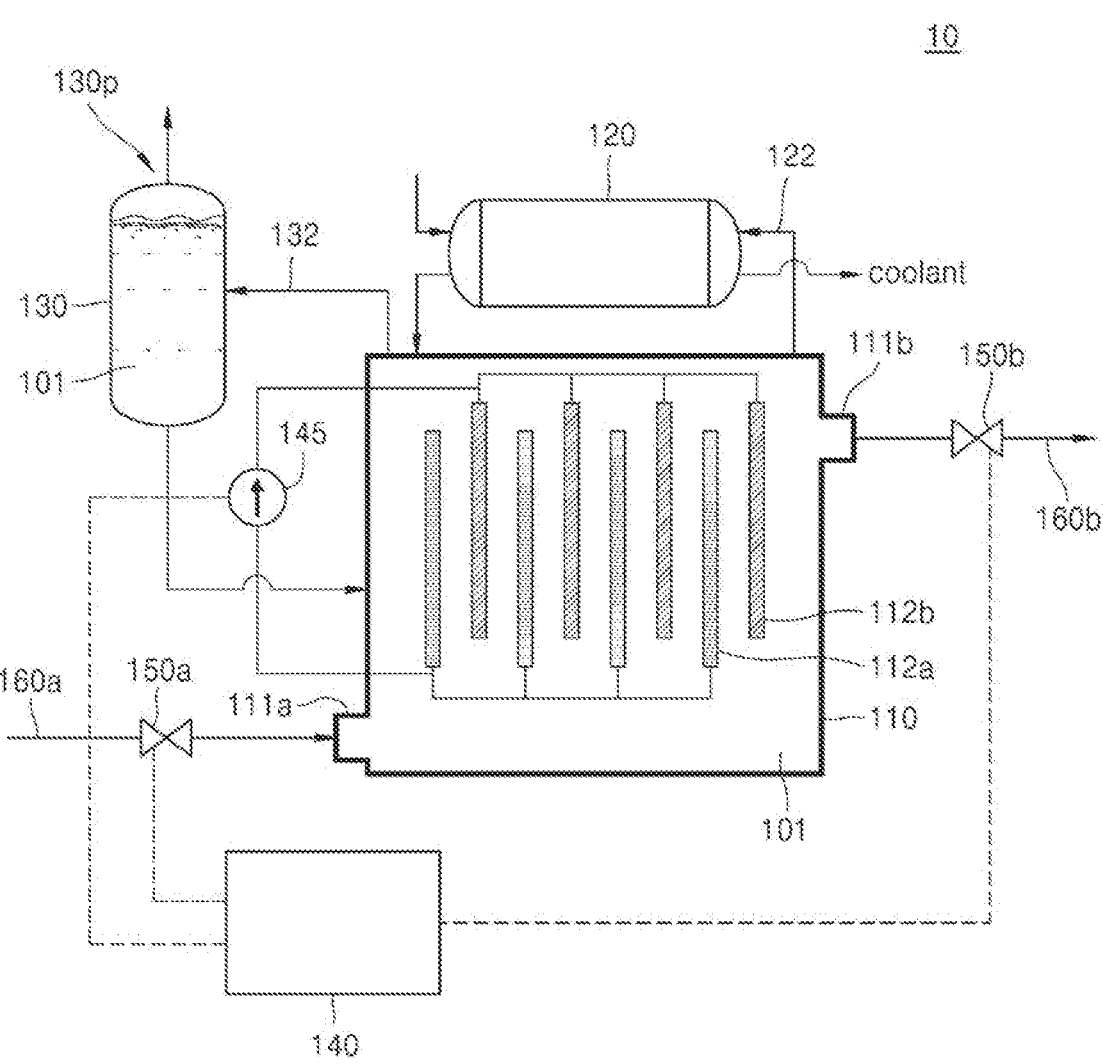
FIG. 2 is a diagram of an electrostatic purification device according to an embodiment of the disclosure.

FIG. 2 is a diagram of an electrostatic purification device according to an embodiment of the disclosure.

Referring to FIG. 2, the electrostatic purification device 10 includes the purification tank housing 110 capable of accommodating a fluid to be purified, and a first electrode 112a and a second electrode 112b provided therein.

The purification tank housing 110 may have a sufficient size and shape to accommodate all the fluid to be purified and the first electrode 112a and the second electrode 112b. The purification tank housing 110 may include an inlet port 111a through which the fluid to be purified is introduced and an outlet port 111b through which the purified fluid is discharged.

One of the inlet port 111a and the outlet port 111b may be located below the purification tank housing 110, and the other may be located above the purification tank housing 110.

In some embodiments, the inlet port 111a may be connected to a first conduit 160a, and the fluid may flow into the purification tank housing 110 through the first conduit 160a and the inlet port 111a. In some embodiments, the outlet port 111b may be connected to a second conduit 160b, and the purified fluid may be discharged from the purification tank housing 110 through the second conduit 160b and the outlet port 111b.

The first valve 150a is provided on the first conduit 160a, and may control inflow of the fluid supplied to the purification tank housing 110. In addition, the second valve 150b is provided on the second conduit 160b, and may control the outflow of the fluid discharged from the purification tank housing 110. The operations of the first valve 150a and the second valve 150b may be controlled by the controller 140, as described in more detail below. The controller 140 may be may be embodied as various numbers of hardware, software and/or firmware structures that execute respective functions described herein, according to embodiments. For example, the controller 140 may include or may be implemented by a processor such as a central processing unit (CPU) that performs the respective functions, a microprocessor, or the like.

Purification of the fluid in the purification tank housing 110 may be performed in a batch manner. This will be described in more detail later.

The first electrode 112a and the second electrode 112b are provided in the purification tank housing 110 and may be configured to be immersed in the fluid to be purified. The first electrode 112a and the second electrode 112b may not be necessarily submerged totally in the fluid, but significant portions of the first electrode 112a and the second electrode 112b may be submerged in the fluid.

In some embodiments, one of the first electrode 112a and the second electrode 112b may act as a cathode and the other may act as an anode. In some embodiments, polarities of the first electrode 112a and the second electrode 112b may be changed according to operations of the entire purification process.

In some embodiments, the first electrode 112a and the second electrode 112b may extend parallel to each other. In some embodiments, the first electrode 112a and the second electrode 112b may extend while maintaining a substantially constant distance from each other.

Figure 3A:
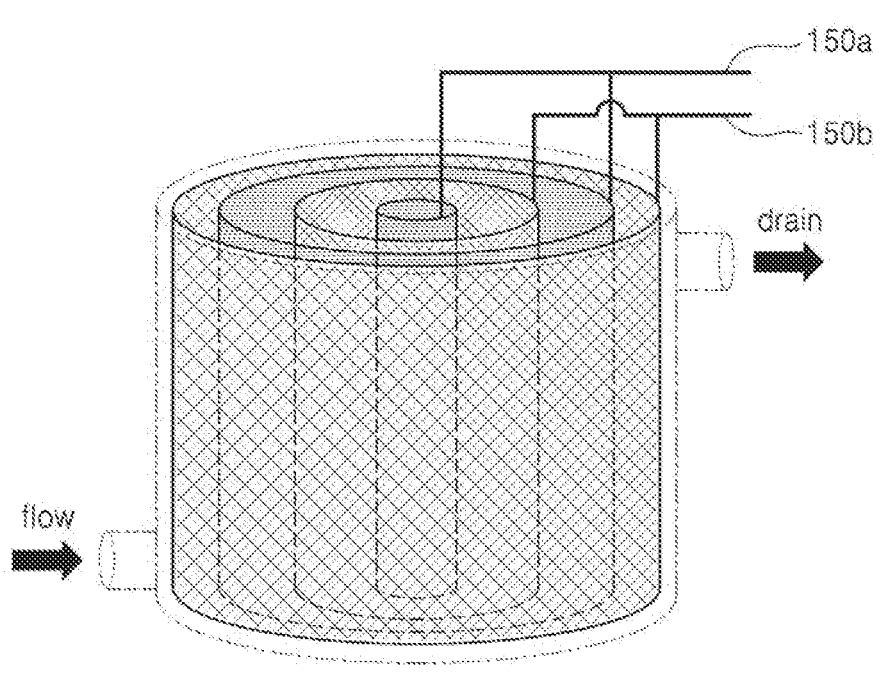
FIGS. 3A, 3B and 3C are diagrams of a first electrode and a second electrode according to embodiments of the disclosure.
Figure 3B:
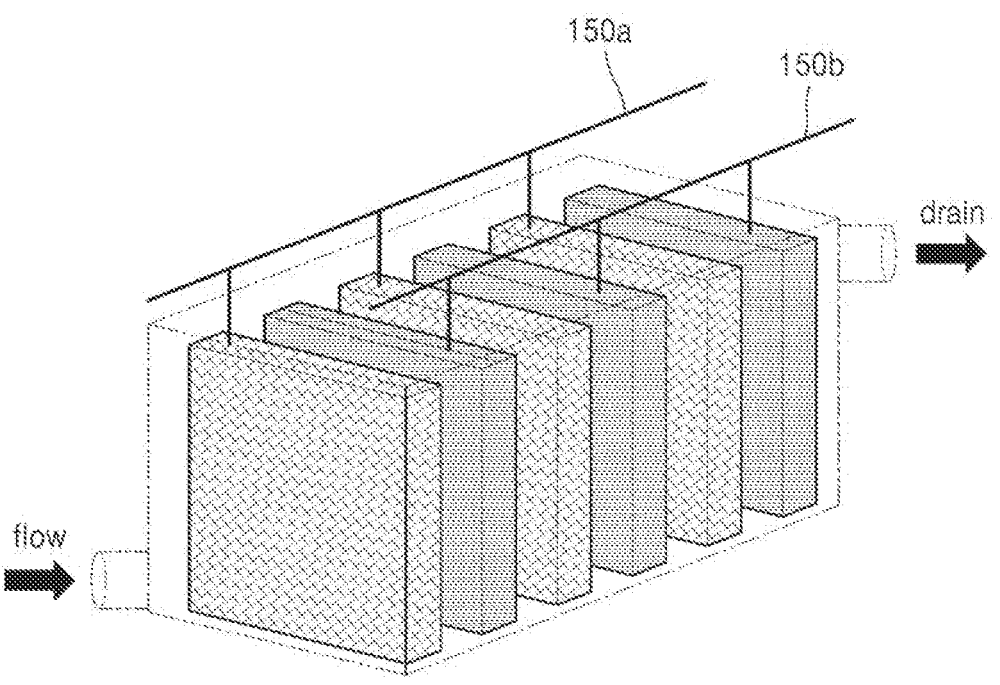
Figure 3C:
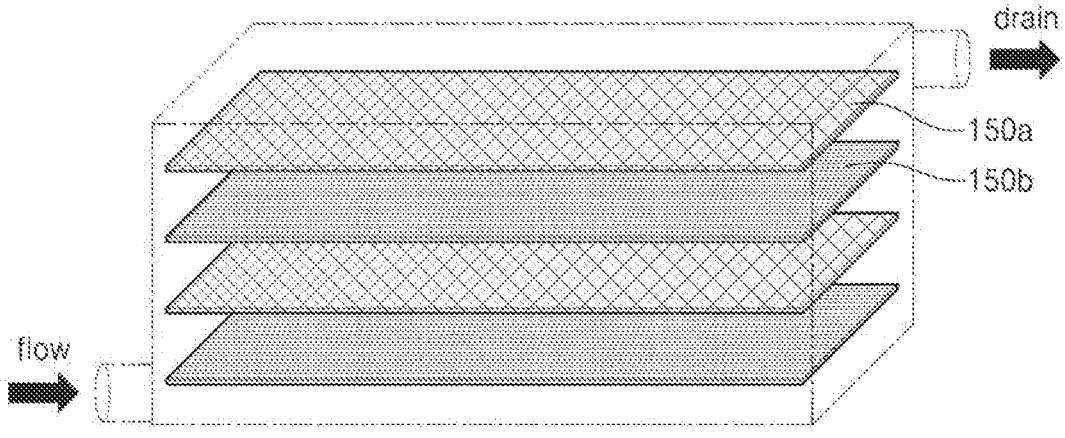

FIGS. 3A, 3B and 3C are diagrams of a first electrode and a second electrode according to embodiments of the disclosure.

Referring to FIG. 3A, in some embodiments, each of the first electrode 112a and the second electrode 112b may include a plurality of electrodes. In particular, the plurality of electrodes constituting each of the first electrode 112a and the second electrode 112b may each have a hollow cylinder shape and may be alternately located. That is, the plurality of electrodes may have different radii of curvature, and the first electrode 112a and the second electrode 112b may be alternately disposed. In some embodiments, the first electrode 112a may extend to be curved while maintaining a substantially constant distance from the neighboring second electrode 112b.

In some embodiments, at least one first electrode 112a may face each of two second electrodes 112b located at the opposite side. In some embodiments, at least one second electrode 112b may face each of two first electrodes 112a located at the opposite side.

Referring to FIG. 3B, in some embodiments, each of the first electrode 112a and the second electrode 112b may include a plurality of electrodes. In particular, the plurality of electrodes constituting each of the first electrode 112a and the second electrode 112b may have a flat plate shape. In addition, the plurality of electrodes constituting each of the first electrode 112a and the plurality of electrodes constituting the second electrode 112b may be alternately disposed in parallel with each other.

In some embodiments, at least one first electrode 112a may face each of two second electrodes 112b located at the opposite side by the same distance. In some embodiments, at least one second electrode 112b may face each of two first electrodes 112a located at the opposite side by the same distance.

Referring to FIG. 3C, each of the first electrode 112a and the second electrode 112b may have a mesh shape. In this case, a contact surface of the first electrode 112a and the second electrode 112b with the fluid may be wider. Furthermore, because a material transfer from one surface of any one of the first electrode 112a and the second electrode 112b to the other surface is relatively free, purification efficiency may be improved.

Although the first electrode 112a and the second electrode 112b in the mesh shape are illustrated as extending in a flat plate shape similar to that of FIG. 3B in FIG. 3C, it will be understood by one of ordinary skilled in the art that the first electrode 112a and the second electrode 112b may extend in a hollow cylindrical shape similar to that of FIG. 3A.

Referring back to FIG. 2, a direct current (DC) power supply 145 configured to supply a DC current to the first electrode 112a and the second electrode 112b is provided. The DC power supply 145 may be configured to change a direction of the DC current as necessary. The operation of the DC power supply 145 may be controlled by the controller 140, as described below.

The DC power supply 145 is configured to supply a DC current such that the intensity of an electric field formed between the first electrode 112a and the second electrode 112b is about 10 V/cm to about 500 V/cm. When the intensity of the electric field is too low, purification efficiency may be too low. When the intensity of the electric field is too high, degeneration of the fluid may be induced.

In some embodiments, the intensity of the electric field may be from about 10 V/cm to about 500 V/cm, from about 15 V/cm to about 480 V/cm, from about 20 V/cm to about 460 V/cm, about 25 V/cm to about 440 V/cm, about 30 V/cm to about 420 V/cm, about 35 V/cm to about 400 V/cm, about 40 V/cm to about 380 V/cm, about 50 V/cm to about 350 V/cm, or a range between any two of these numerical values.

While the fluid is purified due to electrostatic attraction caused by the electric field formed between the first electrode 112a and the second electrode 112b, a gas may be generated due to a byproduct in the fluid. Such a gas may deteriorate purification efficiency, may accumulate in a purification tank to cause an explosion, and may re-dissolve into the fluid, and thus, the gas may be necessarily removed.

In some embodiments, the electrostatic purification device 10 may further include a gas removal tank 130. The gas removal tank 130 may be connected in fluid communication with the purification tank housing 110 through a first circulation conduit 132. That is, the fluid in the purification tank housing 110 may be partially transferred to the gas removal tank 130. While the fluid stays in the gas removal tank 130, the gas may be collected, and unnecessary gas may be discharged through a gas purge port 130p provided above the gas removal tank 130. Thereafter, the fluid may be transferred into the purification tank housing 110.

In some embodiments, a heating device may be provided in the gas removal tank 130 for smoothly collecting and discharging gas. In addition, the circulation of the fluid between the purification tank housing 110 and the gas removal tank 130 may be performed by a pump.

The temperature of a fluid 101 may rise while the fluid 101 is purified due to electrostatic attraction caused by the electric field formed between the first electrode 112a and the second electrode 112b. When the temperature of the fluid 101 unnecessarily rises, because denaturation, decomposition, etc., of the fluid 101 may occur, it may be necessary to cool the fluid 101 so that the temperature of the fluid 101 does not rise excessively.

In some embodiments, the electrostatic purification device 10 may further include the heat exchanger 120. The heat exchanger 120 may be any suitable heat exchanger as will be understood to one of ordinary skill in the art from the disclosure herein, and may be connected in fluid communication with the purification tank housing 110 through second circulation conduits 122.

As shown in FIG. 2, the fluid 101 in the purification tank housing 110 may be partially transferred to the heat exchanger 120 through the second circulation conduits 122 and cooled, and then introduced into the purification tank housing 110 again. The circulation of the fluid 101 may be performed by the pump.

A coolant may be introduced into the heat exchanger 120 to cool the fluid 101. The coolant may be heat exchanged while being spatially spaced apart from the fluid, and then, discharged from the heat exchanger at an elevated temperature. The coolant may be, for example, water having suitable purity and temperature.

The heat exchange above may be performed simultaneously with purifying the fluid 101 by applying the DC to the first electrode 112a and the second electrode 112b.

The controller 140 may be configured to control the operations of the DC power supply 145, the first valve 150a, and the second valve 150b, and control various processes, such as pre-cleaning, post-cleaning, purification of the fluid, etc.

The controller 140 may be configured to close the first valve 150a and the second valve 150b while the purification of the fluid is performed. That is, while the fluid is purified in the purification tank housing 110, the controller 140 may be configured to purify the fluid in a batch manner without entering or leaving the fluid through the first conduit 160a or the second conduit 160b. When the electrostatic purification device 10 is configured to operate in the batch manner, it is possible to purify a fluid more efficiently and in a large amount, compared to purifying the fluid in a continuous flow manner.

Although the disclosure is not limited by a specific theory, it is estimated that when a fluid is purified in a continuous flow manner, the efficiency of collecting impurities, such as ions or charged particles in the electrode, deteriorates due to a bulk flow of the fluid. When a fluid is purified in a batch manner as in the disclosure, because a bulk flow due to forced convection of the fluid does not occur, the effect of diffusion is relatively dominant, and the collection of ions and charged particles by the electric field is accelerated, thereby enabling to purify the fluid in a large amount within a short time.

Figure 4A:
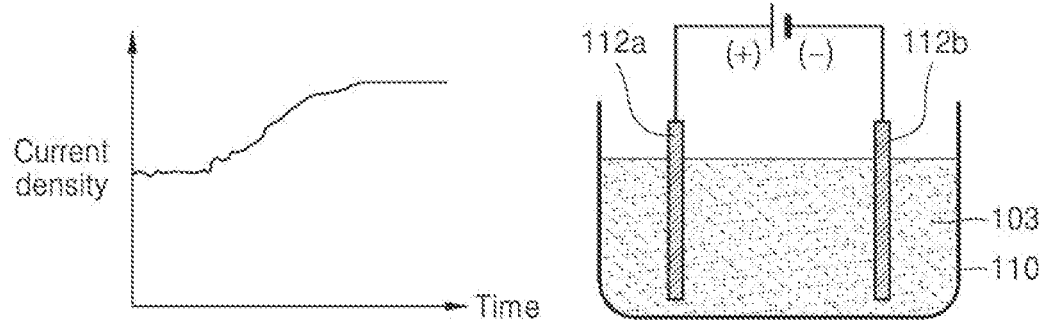
FIGS. 4A, 4B, and 4C are diagrams of a purification principle according to an operation in which a controller controls the first electrode and the second electrode, according to an embodiment of the disclosure.
Figure 4B:
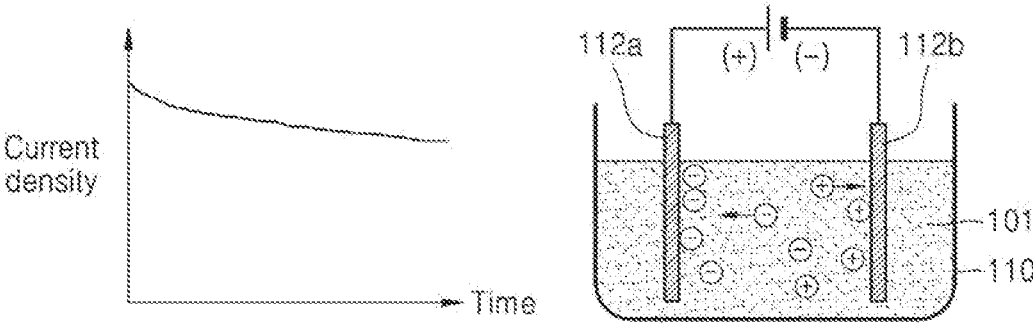
Figure 4C:
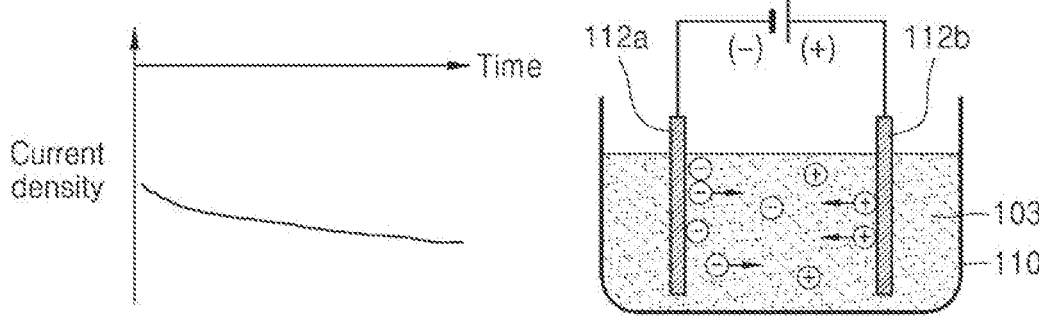

FIGS. 4A, 4B and 4C are diagrams of a purification principle according to an operation in which the controller 140 controls the first electrode 112a and the second electrode 112b according to an embodiment of the disclosure.

The graph of FIG. 4A shows a change trend of a current density between the first electrode 112a and the second electrode 112b when pre-cleaning the first electrode 112a and the second electrode 112b prior to purifying a fluid. Although in FIG. 4A one first electrode 112a and one second electrode 112b are illustrated, this is for convenience, and each of the first electrode 112a and the second electrode 112b may include a plurality of electrodes. Also, a cleaning solution 103 may be filled in the purification tank housing 110 so that the first electrode 112a and the second electrode 112b are immersed in the cleaning solution 103. The cleaning solution 103 may be, for example, UPW, a liquefied or gaseous organic compound, a non-ionic liquid, etc., and may be the same as or different from the fluid to be purified. Although the purification tank housing 110 of FIG. 4A is shown in an open top form for convenience of illustration, a person skilled in the art may configure the purification tank housing 110 in a suitable shape.

Referring to the graph of FIG. 4A, when a first voltage is applied to the first electrode 112a and the second electrode 112b, a constant current density is formed between the first electrode 112a and the second electrode 112b. Impurities may be attached to surfaces of the first electrode 112a and the second electrode 112b, and the impurities may be decomposed by electric energy applied to the first electrode 112a and the second electrode 112b to be dissolved in and removed from the cleaning solution 103. The impurities may be removed from the surfaces of the first electrode 112a and the second electrode 112b over time as described above. Also, as the impurities are removed, the current density between the first electrode 112a and the second electrode 112b gradually increases.

When an increase in the current density over time is insignificant, it may be determined that the effect of removing impurities is saturated and pre-cleaning may end. In some embodiments, it may be determined that pre-cleaning ends when a degree of increase in the current density is within 0.2%, compared to the current density 10 seconds prior. Although 10 seconds prior is the time period described as an example, other embodiments may implement a predetermined time period against which a current density is compared to determine that the effect of removing impurities is saturated and pre-cleaning may end. For example, the system may the current density at a current time and the current density at a previous time selected based on the predetermined time period to determine that the effect of removing impurities is saturated and pre-cleaning may end. The system may also constantly measure the current density throughout the predetermined time period to monitor the change in the current density for determining that the effect of removing impurities is saturated and pre-cleaning may end (i.e., the system may take multiple measurements during the predetermined time period rather than measuring the current density at the beginning of the predetermined time period and at the end of the predetermined time period). In some embodiments, it may be determined that pre-cleaning ends when the degree of increase in the current density is within 0.1%, within 0.3%, within 0.4%, within 0.5%, within 0.6%, within 0.7%, within 0.8%, within 0.9%, within 1.0%, within 1.2%, within 1.4%, within 1.6%, within 1.8%, and within 2.0%.

As described above, a series of processes of applying DC of a first voltage to the first electrode 112a and the second electrode 112b, monitoring the change trend in the current density, and determining whether to end pre-cleaning may be performed by the controller 140.

The graph of FIG. 4B shows a change trend of the current density between the first electrode 112a and the second electrode 112b when the fluid 101 is purified. Although in FIG. 4B one first electrode 112a and one second electrode 112b are illustrated, this is for convenience, and each of the first electrode 112a and the second electrode 112b may include a plurality of electrodes. Also, the first electrode 112a and the second electrode 112b may be immersed in the fluid 101 to be purified. The fluid 101 may be, for example, UPW, a liquefied or gaseous organic compound, a non-ionic liquid, etc.

Referring to the graph of FIG. 4B, when DC of a second voltage is applied to the first electrode 112a and the second electrode 112b, a constant electric field is formed between the first electrode 112a and the second electrode 112b. The charged particles and/or ions in the fluid 101 are attached to the surface of the first electrode 112a or the second electrode 112b according to polarity. That is, positively charged particles and/or ions are attached to the surface of the second electrode 112b of FIG. 4B, and negatively charged particles and/or ions are attached to the surface of the first electrode 112a of FIG. 4B. An amount of charged particles and/or ions attached to the surfaces of the first electrode 112a and the second electrode 112b increases over time, and an amount of the charged particles and/or ions dissolved in the fluid 101 decreases. In other words, the fluid 101 is purified over time by the first electrode 112a and the second electrode 112b, to which the second voltage is applied.

In addition, because the amount of the charged particles and/or ions attached to the surfaces of the first electrode 112a and the second electrode 112b increases over time, the current density between the first electrode 112a and the second electrode 112b gradually decreases. That is, as an area of the surfaces of the first electrode 112a and the second electrode 112b, to which the charged particles and/or ions are attached, increases, the current density between the first electrode 112a and the second electrode 112b gradually decreases.

When a degree of decrease in the current density over time is insignificant, it may be determined that purification is completed and purification may end. In some embodiments, when the degree of decrease in the current density is equal to or less than 0.2%, compared to the current density within a predetermined time period (e.g., 10 seconds prior), it may be determined that purification ends. In some embodiments, it may be determined that purification ends when the degree of decrease in the current density is within 0.1%, within 0.3%, within 0.4%, within 0.5%, within 0.6%, within 0.7%, within 0.8%, within 0.9%, within 1.0%, within 1.2%, within 1.4%, within 1.6%, within 1.8%, and within 2.0%, compared to the current density within a predetermined time period (e.g., 10 second prior).

In some embodiments, when the current density between the first electrode 112a and the second electrode 112b decreases by a first, predetermined percentage, compared to the current density immediately after applying the DC of the second voltage, it may be determined that purification ends. Here, the first percentage may be in a range of about 0.5% to about 15%. In some embodiments, the first percentage may be from about 0.6% to about 14.5%, from about 0.7% to about 14%, from about 0.8% to about 13.5%, from about 0.9% to about 13%, from about 1.0% to about 12.5% %, from about 1.1% to about 12%, from about 1.2% to about 11.5%, from about 1.3% to about 11%, from about 1.4% to about 10.5%, from about 1.5% to about 10%, from about 1.6% to about 9.5%, from about 1.7% to about 9%, from about 1.8% to about 8.5%, from about 1.9% to about 8%, from about 2.0% to about 7.5%, from about 2.1% to about 7%, from about 2.2% to about 6.5%, from about 2.3% to about 6%, from about 2.4% to about 5.5%, from about 2.5% to about 5%, or in a range between any two of the numerical values.

Even when purification ends, the application of the DC of the second voltage may be maintained as it is. Also, the purified fluid 101 may be discharged from the purification tank housing 110 while the application of the DC of the second voltage is maintained. The fluid 101 while maintaining the application of the DC of the second voltage as described above may be discharged, and thus, the charged particles and/or ions attached to the surfaces of the first electrode 112a and the second electrode 112b may be prevented from being detached, and mixed again into the fluid 101.

As described above, a series of processes of applying the DC of the first voltage to the first electrode 112a and the second electrode 112b, monitoring the change trend in the current density, and determining whether to end purification may be performed by the controller 140.

The graph of FIG. 4C shows a change trend in the current density between the first electrode 112a and the second electrode 112b when the first electrode 112a and the second electrode 112b are post-cleaned after the fluid is purified. Although one first electrode 112a and one second electrode 112b are illustrated in FIG. 4C, this is for convenience, and each of the first electrode 112a and the second electrode 112b may include a plurality of electrodes. Also, the first electrode 112a and the second electrode 112b may be immersed in the cleaning solution 103. The cleaning solution 103 may be, for example, UPW, a liquefied or gaseous organic compound, a non-ionic liquid, etc., and may be the same as or different from the fluid to be purified.

In some embodiments, when the cleaning solution 103 is filled in the purification tank housing 110 to immerse the first electrode 112a and the second electrode 112b, the application of the DC of the second voltage, as described with reference to FIG. 4B, may be maintained.

Referring to the graph of FIG. 4C, after the cleaning solution 103 is filled so that the first electrode 112a and the second electrode 112b are immersed in the purification tank housing 110, a DC of a third voltage may be applied to the first electrode 112a and the second electrode 112b. The DC of the third voltage may have a current direction opposite to that of the DC of the second voltage. When the DC of the third voltage is applied to the first electrode 112a and the second electrode 112b, a constant current density is formed between the first electrode 112a and the second electrode 112b. In this regard, a direction of an electric field is opposite to the case shown in FIG. 4B.

The positively charged particles and/or ions attached to the surface of the second electrode 112b may receive a repulsive force due to the DC of the third voltage and thus may be easily detached from the second electrode 112b. In addition, the negatively charged particles and/or ions attached to the surface of the first electrode 112a may receive a repulsive force due to the DC of the third voltage and thus may be easily detached from the first electrode 112a. The amount of charged particles and/or ions attached to the surfaces of the first electrode 112a and the second electrode 112b may decrease over time, and the detached charged particles and/or ions may diffuse into the cleaning solution 103. In other words, the surfaces of the first electrode 112a and the second electrode 112b, to which charged particles and/or ions have been attached, may be post-cleaned by the application of the DC of the third voltage.

In addition, because the charged particles and/or ions attached to the surfaces of the first electrode 112a and the second electrode 112b are continuously removed over time, an absolute value of the current density between the first electrode 112a and the second electrode 112b gradually increases. That is, as the area of the surfaces of the first electrode 112a and the second electrode 112b, to which charged particles and/or ions are attached, decreases, the absolute value of the current density between the first electrode 112a and the second electrode 112b gradually increases.

When a degree of increase in the absolute value of the current density over time (e.g., over a predetermined time period) is insignificant, it may be determined that post-cleaning is completed and post-cleaning may end. In some embodiments, when the degree of increase in the absolute value of the current density is equal to or less than 0.2%, compared to the current density within a predetermined time period (e.g., 10 seconds prior), it may be determined that post-cleaning ends. In some embodiments, it may be determined that post-cleaning ends when the degree of increase in the absolute value of the current density is within 0.1%, within 0.3%, within 0.4%, within 0.5%, within 0.6%, or 0.7%, within 0.8%, within 0.9%, within 1.0%, within 1.2%, within 1.4%, within 1.6%, within 1.8%, and within 2.0%, compared to the current density before 10 seconds.

As described above, a series of processes of applying the DC of the third voltage to the first electrode 112a and the second electrode 112b, monitoring the change trend in the current density, and determining whether to end post-cleaning may be performed by the controller 140.

Figure 5:
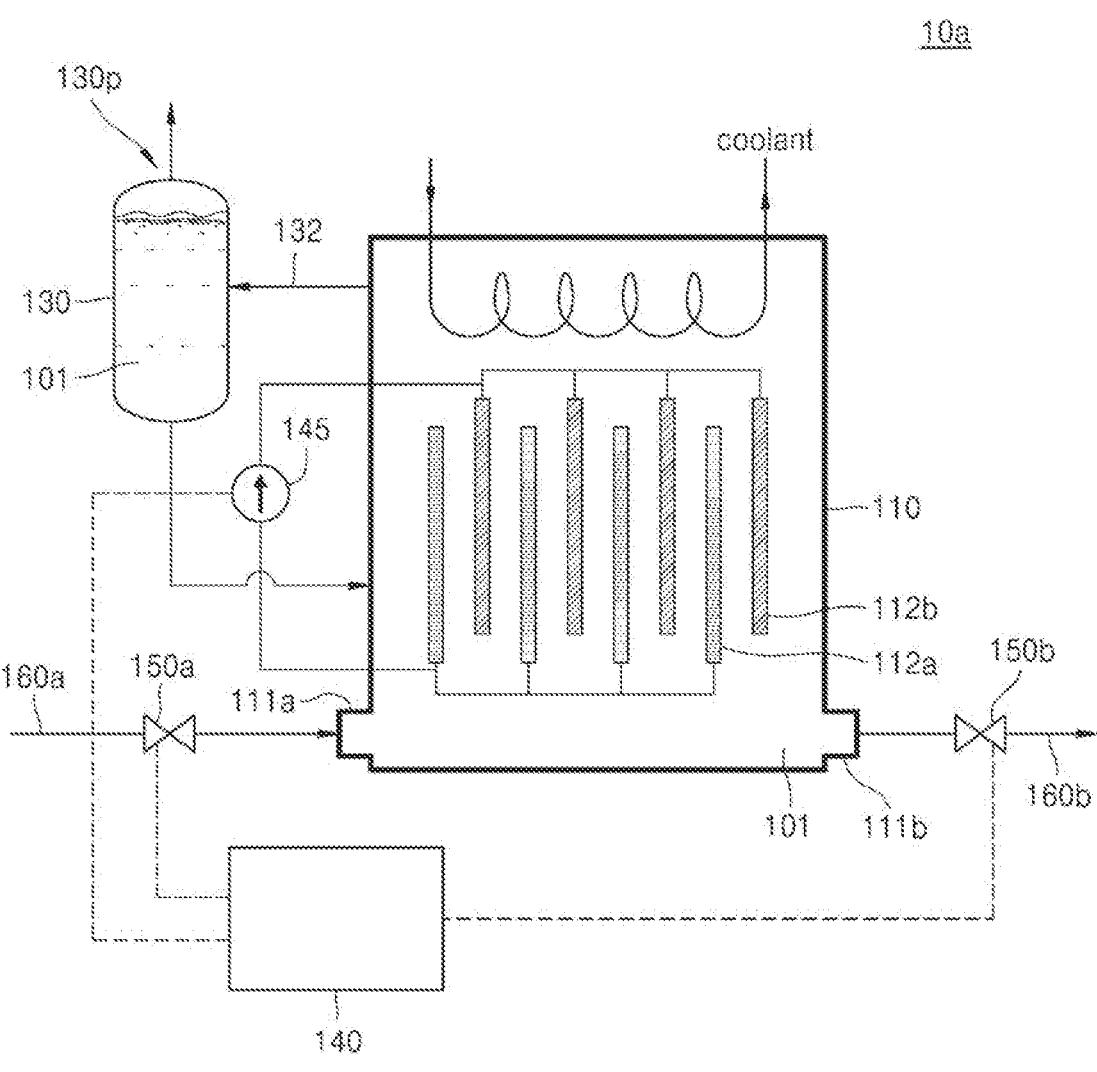
FIGS. 5 and 6 are diagrams respectively of electrostatic purification devices according to an embodiment of the disclosure.
Figure 6:
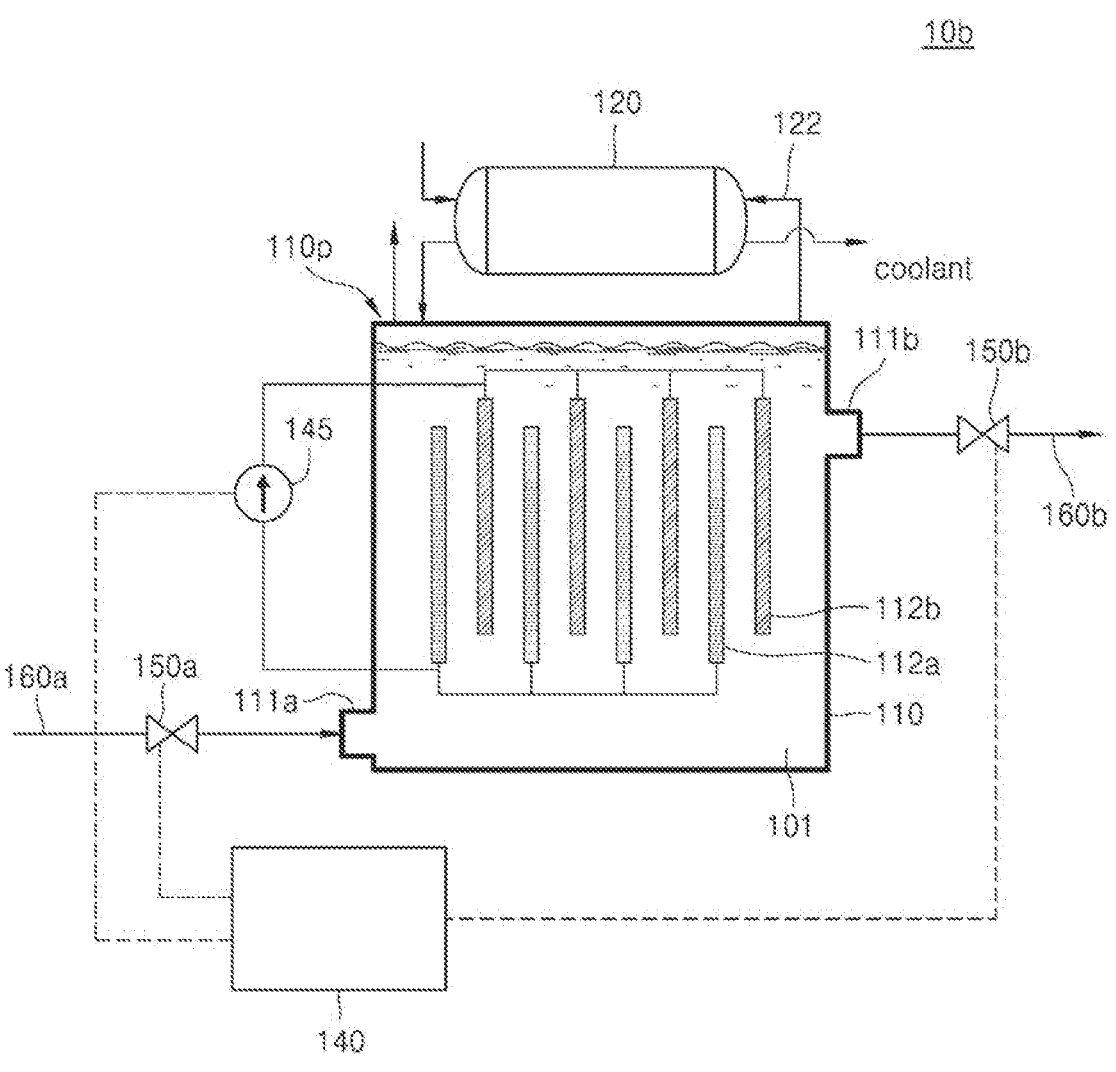

FIGS. 5 and 6 are diagrams respectively of electrostatic purification devices according to an embodiment of the disclosure.

The electrostatic purification device 10a according to an embodiment of FIG. 5 is different from the electrostatic purification device 10 described with reference to FIG. 2 in that the heat exchanger 120 is omitted and a conduit for heat exchange is integrated into the purification tank housing 110. Therefore, such differences will be mainly described below.

Referring to FIG. 5, the conduit through which a coolant passes may extend into the purification tank housing 110, contact the fluid 101 to be purified to cool the fluid 101 and then, extend to the outside of the purification tank housing 110.

In some embodiments, the conduit may be bent or branched within the purification tank housing 110 to secure a larger contact area. In some embodiments, the conduit may have a cross-sectional shape modified within the purification tank housing 110 or a fin may be provided on an outer surface of the conduit to secure a larger contact area.

The electrostatic purification device 10a according to an embodiment of FIG. 5 has a simple structure and control because the conduit through which the coolant passes is provided directly inside the purification tank housing 110 without a separate heat exchanger.

The electrostatic purification device 10b according to the embodiment of FIG. 6 is different from the electrostatic purification device 10 described with reference to FIG. 2 in that the gas removal tank 130 is omitted and the gas purge port 110p discharging gas is provided above the purification tank housing 110. Therefore, such differences will be mainly described below.

Referring to FIG. 6, a free surface of the fluid 101 to be purified may be at a level lower than a ceiling of the purification tank housing 110. Therefore, the gas generated from the fluid 101 is collected in a space between the free surface of the fluid 101 and the ceiling of the purification tank housing 110, and the collected gas may be discharged to the outside of the purification tank housing 110 through the gas purge port 110p.

In some embodiments, a valve capable of preventing a reverse flow of the discharged gas and/or external atmosphere may be provided in the conduit extending outward from the gas purge port 110*p*.

The electrostatic purification device 10*b* according to an embodiment of FIG. 6 has a simple structure and is easy to maintain and repair because gas may be removed through the gas purge port 110*p* provided above the purification tank housing 110 without a separate gas removal tank.

Figure 7:
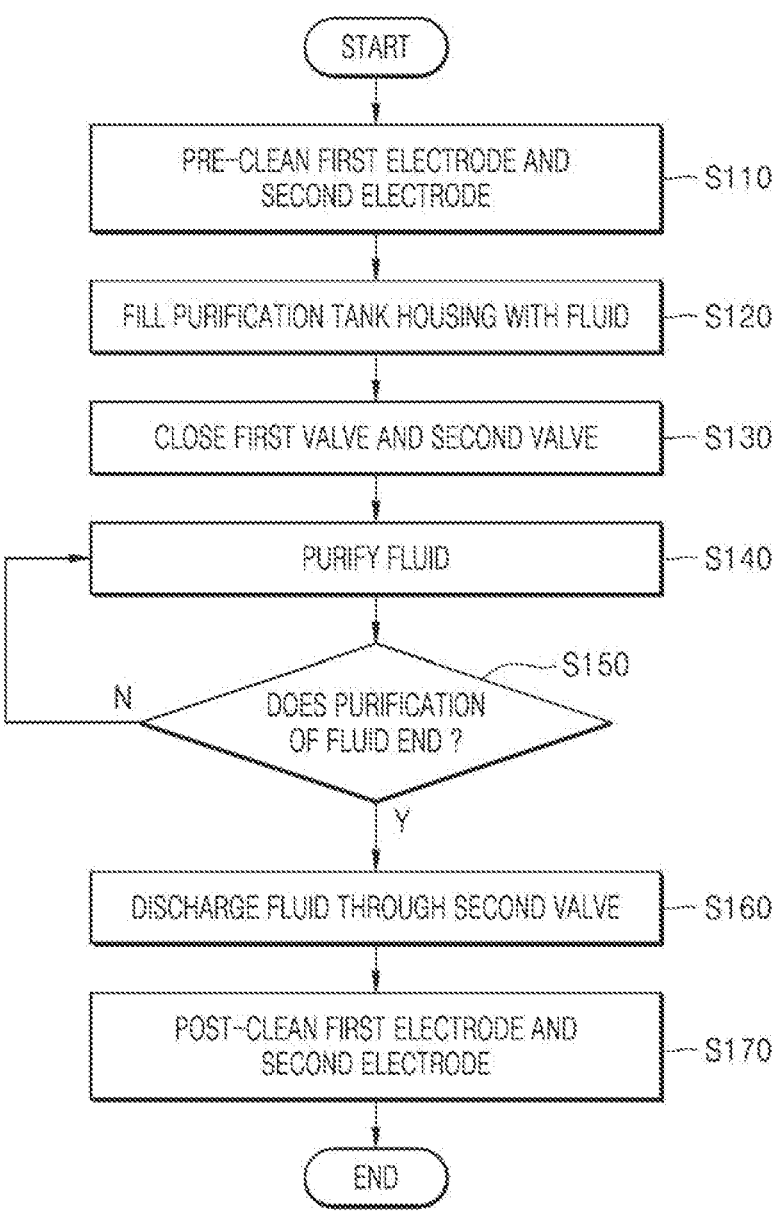
FIG. 7 is a flowchart of a method of purifying a fluid, according to an embodiment of the disclosure.

FIG. 7 is a flowchart of a method of purifying a fluid, according to an embodiment of the disclosure.

Referring to FIGS. 1, 2, 4A, and 7 together, in operation S110, pre-cleaning may be performed on the first electrode 112*a* and the second electrode 112*b* in the purification tank housing 110.

For pre-cleaning, the cleaning solution 103 may be filled in the purification tank housing 110 so that the first electrode 112*a* and the second electrode 112*b* are immersed in the cleaning solution 103. Thereafter, a DC of a first voltage may be applied to the first electrode 112*a* and the second electrode 112*b*. As described with reference to FIG. 4A, by applying the DC of the first voltage, impurities on surfaces of the first electrode 112*a* and the second electrode 112*b* may be decomposed and removed.

While pre-cleaning is performed, the first valve 150*a* and the second valve 150*b* may be maintain in a closed state. The state of the first valve 150*a* and the second valve 150*b* may be controlled by the controller 140.

Thereafter, an end time of pre-cleaning may be determined by the controller 140 that monitors a current density between the first electrode 112*a* and the second electrode 112*b* in-situ, as described with reference to FIG. 4A. When pre-cleaning ends, the cleaning solution 103 used for pre-cleaning may be discharged by opening the second valve 150*b* with the first valve 150*a* closed.

Then, in operation S120, by opening the first valve 150*a* with the second valve 150*b* closed, the fluid 101 to be purified may be filled into the purification tank housing 110 from the supply tank 20. At this time, the fluid 101 may be transferred to the purification tank housing 110 by using a pump 50.

In operation S130, when filling of the fluid 101 into the purification tank housing 110 is completed, the first valve 150*a* and the second valve 150*b* may be closed.

Referring to FIGS. 1, 2, 4B, and 7 together, in operation S140, purification of the fluid 101 is performed by applying a DC of a second voltage to the first electrode 112*a* and the second electrode 112*b*.

As described above with reference to FIG. 4B, as purification of the fluid 101 is performed, charged particles and/or ions in the fluid 101 are attached to a surface of the first electrode 112*a* or the second electrode 112*b* according to polarity. Also, due to attachment of the charged particles and/or ions, the current density between the first electrode 112*a* and the second electrode 112*b* gradually decreases over a purification time.

In operation S510, the controller 140 may determine that purification is completed when a degree of decrease in the current density over time is insignificant. A method, performed by the controller 140, of determining the end of purification is described above with reference to FIG. 4B, and thus a detailed description thereof will be omitted. A person skilled in the art will be able to determine an end time of purification in a generally similar context, although somewhat different from that described with reference to FIG. 4B.

Once the controller 140 determines that purification is completed, in operation S160, the fluid 101 may be transferred to the storage tank 40 through the filter 30 by opening the second valve 150*b* with the first valve 150*a* closed. At this time, application of the DC of the second voltage to the first electrode 112*a* and the second electrode 112*b* may be maintained.

Referring to FIGS. 1, 2, 4C, and 7 together, in operation S170, post-cleaning may be performed by filling the purification tank housing 110 with the cleaning solution 103.

First, as in pre-cleaning described above, the cleaning solution 103 may be filled in the purification tank housing 110 so that the first electrode 112*a* and the second electrode 112*b* are immersed in the cleaning solution 103. At this time, the first valve 150*a* may be opened by the controller 140 and the second valve 150*b* may be closed, and application of the DC of the second voltage to the first electrode 112*a* and the second electrode 112*b* may still be maintained.

After filling of the cleaning solution 103 is completed, the first valve 150*a* and the second valve 150*b* may be closed, and a DC of a third voltage may be applied to the first electrode 112*a* and the second electrode 112*b*. The DC of the third voltage may have a current direction opposite to that of the DC of the second voltage.

As described above with reference to FIG. 4C, an absolute value of the current density increases over time. When a degree of increase is insignificant, it is determined that post-cleaning is completed and post-cleaning ends. When post-cleaning ends, the second valve 150*b* is opened and the cleaning solution 103 is discharged from the purification tank housing 110.

While the disclosure has been particularly shown and described with reference to embodiments thereof, it will be understood that various changes in form and details may be made therein without departing from the spirit and scope of the following claims.

What is claimed is:

1. An electrostatic purification device, the electrostatic purification device comprising:
   a purification tank housing configured to accommodate a fluid;
   a first electrode and a second electrode provided in the purification tank housing;
   a direct current (DC) power supply configured to apply a DC to the first electrode and the second electrode;
   a controller configured to:
      monitor a current density between the first electrode and the second electrode, and
      determine whether purification is completed based on the current density;
   a first valve configured to control an introduction flow of the fluid into the purification tank housing;
   a second valve configured to control a discharge flow of the fluid from the purification tank housing; and
   a heat exchanger configured to cool the fluid accommodated in the purification tank housing,
   wherein the controller is further configured to determine that purification is completed based on a degree of decrease in the current density over a predetermined time period being less than a predetermined threshold, and
   wherein the controller is further configured to, based on determining that purification is completed, open the second valve while maintaining application of the DC to the first electrode and the second electrode.

2. The electrostatic purification device of claim 1, wherein the controller is further configured to close the first valve and the second valve while the DC power supply applies the DC to the fluid.

3. The electrostatic purification device of claim 1, wherein the controller is further configured to determine that purification is completed based on the current density decreasing by a first percentage, and wherein the first percentage is in a range of about 0.5% to about 15%.

4. The electrostatic purification device of claim 1, wherein the controller is further configured to determine that purification is completed based on the degree of decrease of the current density being equal to or less than 0.2% within the predetermined time period.

5. The electrostatic purification device of claim 1, further comprising:

a gas removal tank connected to and in fluid communication with the purification tank housing through first circulation conduits, wherein the gas removal tank comprises a gas purge port.

6. The electrostatic purification device of claim 1, wherein a gas purge port is provided in an upper portion of the purification tank housing.

7. The electrostatic purification device of claim 1, wherein the heat exchanger is connected to and in fluid communication with the purification tank housing through second circulation conduits, and wherein the heat exchanger is further configured such that the fluid circulates the purification tank housing and the heat exchanger through the second circulation conduits while the DC power supply applies the DC to the first electrode and the second electrode.

8. A fluid purification system, comprising:

a supply tank of a fluid;

an electrostatic purification device configured to:

receive the fluid from the supply tank, and purify the fluid;

a filter configured to filter the fluid; and a storage tank configured to store the fluid that is filtered, wherein the electrostatic purification device comprises:

a purification tank housing configured to accommodate the fluid;

a first electrode and a second electrode provided in the purification tank housing;

a direct current (DC) power supply configured to apply a DC to the first electrode and the second electrode;

a controller configured to:

monitor a current density between the first electrode and the second electrode, and determine whether purification is completed based on the current density;

a first valve configured to control an introduction flow of the fluid into the purification tank housing;

a second valve configured to control a discharge flow of the fluid from the purification tank housing; and a heat exchanger configured to cool the fluid accommodated in the purification tank housing, and wherein the controller is further configured to determine that purification is completed based on a degree of decrease in the current density over a predetermined time period being less than a predetermined threshold, and wherein the controller is further configured to, based on determining that purification is completed, open the second valve while maintaining application of the DC to the first electrode and the second electrode.

9. The fluid purification system of claim 8, wherein the first valve is positioned to control the fluid to flow from the supply tank to the purification tank housing, and wherein the second valve is positioned to control the fluid to flow from the purification tank housing to the storage tank.

10. The fluid purification system of claim 8, wherein each of the first electrode and the second electrode comprises a plurality of flat plates, and wherein the first electrode and the second electrode are alternately arranged in parallel to each other.

11. The fluid purification system of claim 8, wherein the first electrode and the second electrode are configured to extend to be curved while maintaining a substantially constant distance from each other.

12. The fluid purification system of claim 8, wherein the electrostatic purification device further comprises a gas removal tank connected to and in fluid communication with the purification tank housing through first circulation conduits, and wherein the gas removal tank comprises a gas purge port.

13. The fluid purification system of claim 8, wherein the controller is further configured to close the first valve and the second valve while the DC power supply applies the DC to the first electrode and the second electrode.

* * * * *